United States Patent
Chen et al.

(10) Patent No.: US 7,881,556 B2
(45) Date of Patent: Feb. 1, 2011

(54) METHOD OF IMAGE PROCESSING AND DEVICE THEREOF

(75) Inventors: Shing-Chia Chen, Tainan County (TW); Ling-Hsiu Huang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 783 days.

(21) Appl. No.: 11/870,232

(22) Filed: Oct. 10, 2007

(65) Prior Publication Data
US 2009/0097747 A1     Apr. 16, 2009

(51) Int. Cl.
*G06K 9/40* (2006.01)
(52) U.S. Cl. .................. 382/274; 382/275; 382/278
(58) Field of Classification Search ................ 382/260, 382/274, 275, 278; 358/3.26, 3.27, 463
See application file for complete search history.

(56) References Cited

U.S. PATENT DOCUMENTS

| | | | | |
|---|---|---|---|---|
| 7,258,502 B2 * | 8/2007 | Nagae et al. | ................ | 400/611 |
| 7,375,854 B2 * | 5/2008 | Hsu et al. | .................... | 358/1.9 |
| 7,379,124 B2 * | 5/2008 | George et al. | ............... | 348/745 |
| 7,398,025 B2 * | 7/2008 | Campbell et al. | ............. | 399/49 |
| 7,436,413 B2 * | 10/2008 | Kanai | ......................... | 345/611 |

* cited by examiner

*Primary Examiner*—Yosef Kassa
(74) *Attorney, Agent, or Firm*—J.C. Patents (57) ABSTRACT

A method of image processing and a device thereof are provided in the present invention. First, an image having a plurality of regions is received, wherein each region comprises a plurality of pixels. A contrast process is performed on each region and a respective local curve of each region is analyzed, wherein the local curve is a corresponding relation between the gray-level values of the pixels in each region before and after the contrast process. Next, the gray-level value of one of the pixels in a boundary between one of the regions and the neighboring region is adjusted according to the respective local curves of the one of the regions and the neighboring region. The local contrast process towards to each region is performed for enhancing the image. Therefore, not only can the features be obvious, but the non-uniform area in the boundary between the regions also can be smoothed.

6 Claims, 6 Drawing Sheets

METHOD OF IMAGE PROCESSING AND DEVICE THEREOF

BACKGROUND OF THE INVENTION

1. Field of the Invention

The present invention relates to an image processing method and a device thereof, and more particularly, to a method of locally improving the contrast of the image by regions and a device thereof.

2. Description of Related Art

In the field of the image processing, most people are interested in the image enhancement technique. Basically, the concept of the image enhancement technique is to make the indistinct details of the image reveal or make some interesting features of the image more obvious. The subjective sensation of human visual system is considered in the image enhancement technique. Generally speaking, the ability of human eyes for distinguishing different luminance levels affects the display result of the image processing. For example, if an image tends to dimness (or dark), the details of the image can not be clearly seen by human eyes so that the gray-level range of the image needs to be expanded, that is, performing a contrast processing on the image.

Figure 1:
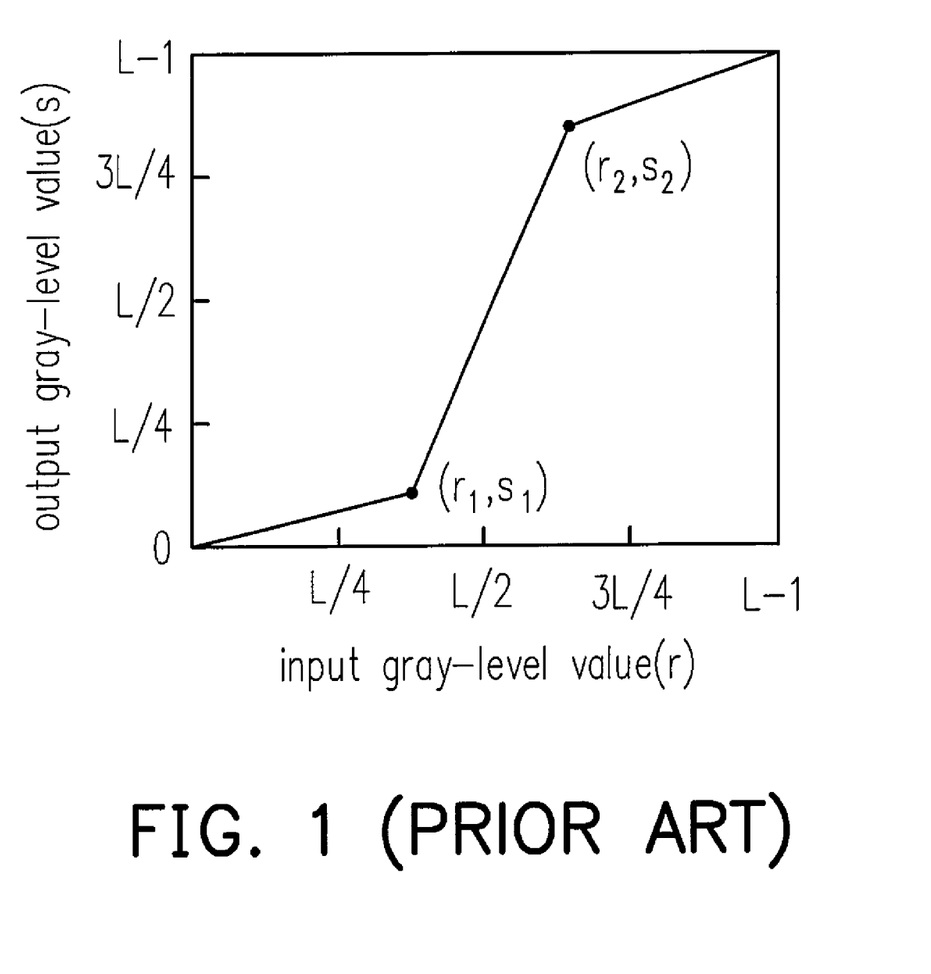
FIG. 1 is a diagram of typical transfer used for performing the contrast processing.

The contrast processing is to increase the dynamical gray-level range of the image. FIG. 1 is a diagram of typical transfer used for performing the contrast processing. Referring FIG. 1, the input gray-level values $r_1$ and $r_2$ are respectively transferred to the gray-level value $s_1$ and $s_2$, wherein the gray-level value $r_1$ and $r_2$ are respectively the minimum and maximum gray-level values of the original image. Therefore, the gray-level range of the original image can be expanded to the gray-level range between the gray-level value 0 and the gray-level value L-1 through the contrast processing.

Figure 2A:
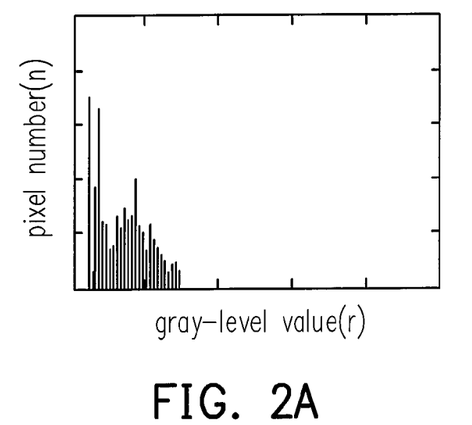
FIGS. 2A to 2C are the respective histograms of the dim image, the bright image and the image with low contrast.
Figure 2B:
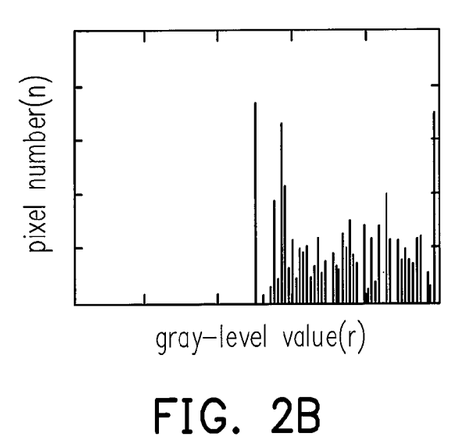
Figure 2C:
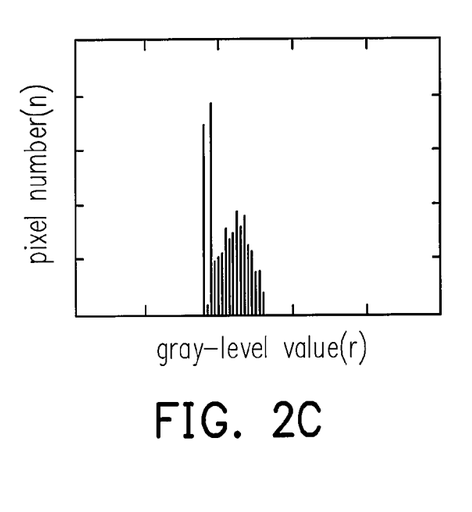

In addition, a gray-level histogram of the image is also used for performing the contrast processing. The gray-level histogram is a discrete function expressed as $h(r_k)=n_k$, wherein $r_k$ is the $k^{th}$ gray-level value and $n_k$ is the pixel number of the gray-level value $r_k$. FIGS. 2A to 2C are the respective histograms of the dim image, the bright image and the image with low contrast. Referring to FIG. 2A, if the image tends to dimness, the components of the histogram thereof are concentrated on the low gray-level values. On the contrary, referring to FIG. 2B, the components of the histogram of the bright image are concentrated on the high gray-level values. Moreover, referring to FIG. 2C, the components of the histogram of the image with low contrast are concentrated on the middle gray-level range and the said gray-level range is narrow. In intuition, the components of the histogram of the image with high contrast may contain a wide gray-level range and the pixel number is close to be uniformly distributed over each of the gray-level values. Hence, a transfer function, such as the transfer curve in FIG. 1, is developed according to the information of the histogram of the image for a purpose of making more gray-level details of the image obvious and expanding the gray-level range of the image.

However, an image may have several features or details distributing over different regions of the image and the features or details extremely differ from each other. If the contrast processing is performed on the whole image according to a fixed transfer function or a fixed contrast adjustment, the features or details are not obvious because of the mutual influences. Therefore, simultaneously giving consideration to enhance the contrast of the image and to maintain the features or details of the image is an important issue for study and discussion.

SUMMARY OF THE INVENTION

Accordingly, the present invention provides a method of image processing and a device thereof that the contrast of the image is locally enhanced by regions and the pixels in the boundary between the image regions are adjusted according to the adjusted results of the image regions. Therefore, the features or details in each image region can reveal or be obvious through local contrast processing and the non-uniform area between the image regions can be smoothed through adjusting the said pixels in the boundary so as to enhance the display quality of the image.

A method of image processing is provided in the present invention. First an image is received, wherein the image has a plurality of regions and each of the regions comprises a plurality of pixels. Next, a contrast process is performed on each of the regions and a respective local curve of each of the regions is analyzed, wherein the local curve is a corresponding relation between the gray-level values of the pixels in each of the regions before and after the contrast process. Next, the gray-level value of one of the pixels in a boundary between one of the regions and the neighboring region is adjusted according to the respective local curves of the one of the regions and the neighboring region.

A device of image processing is provided in the present invention. The device of image processing comprises a contrast improvement module, an analysis module and an operation module. The contrast improvement module receives and image having a plurality of regions for performing a contrast process on each of the regions, wherein each of the regions comprises a plurality of pixels. The analysis module is coupled to the contrast improvement module for analyzing a respective local curve of each of the regions, wherein the local curve is a corresponding relation between the gray-level values of the pixels in each of the regions before and after the contrast process. The operation module is coupled to the analysis module for adjusting the gray-level value of one of the pixels in a boundary between one of the regions and the neighboring region according to the respective local curves of the one of the regions and the neighboring region.

The present invention provides a method of image processing and a device thereof, which performs a local contrast processing on each of the image regions for making the features or detail obvious in each image region. However, a non-uniform area (or called artifacts) perceived by human eyes appears in the boundary between the image regions through local contrast processing. The present invention analyzes a local curve of each of the image regions, which is a corresponding relation between the pixels values of each image region before and after the contrast processing, for adjusting the pixels in the boundary between the image regions. Therefore, the said non-uniform area can be smoothed for proper vision and the display quality of the image is enhanced on the whole.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3:
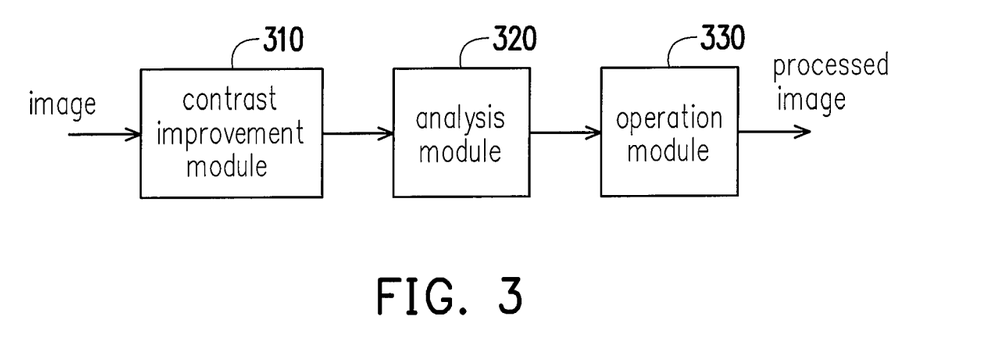
FIG. 3 is a block diagram of the device of image processing according to one embodiment of the present invention.

FIG. 3 is a block diagram of the device of image processing according to one embodiment of the present invention. Referring to FIG. 3, the image processing device includes a contrast improvement module 310, an analysis module 320 and an operation module 330. The contrast improvement module 310 receives an image having a plurality of regions and performs a contrast process on each of the regions, which each of the regions includes a plurality of pixels. The analysis module 320 is coupled to the contrast improvement module 310 and is used for analyzing a respective local curve of each of the regions, wherein the local curve is a corresponding relation between the gray-level values of the pixels in each of the regions before and after the said contrast process. The operation module 330 is coupled to the analysis module 320 and is used for adjusting the gray-level value of one of the pixels in a boundary between one of the regions and the neighboring region according to the respective local curves of the one of the regions and the neighboring region. The following description is the detailed operation of each module.

Figure 4:
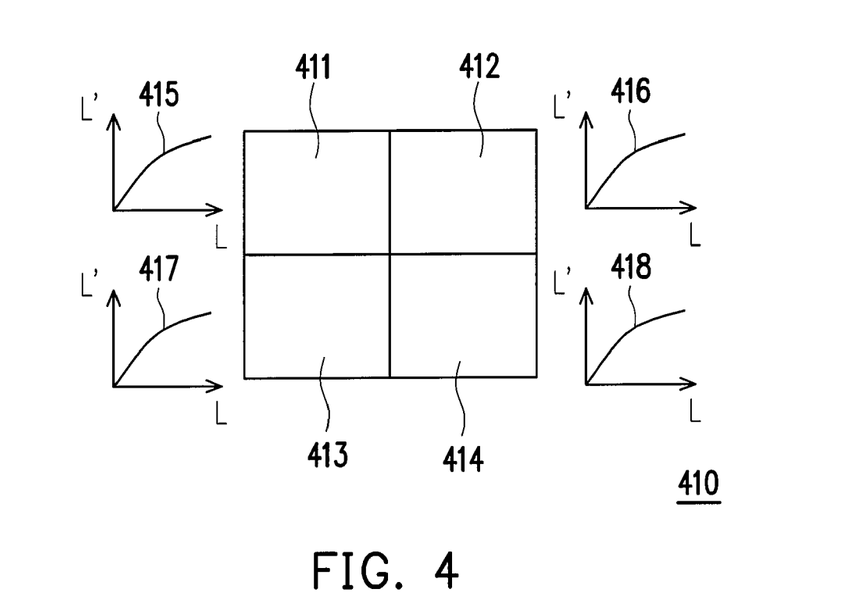
FIG. 4 is a diagram of an image having a plurality of regions according to one embodiment of the present invention.
Figure 5A:
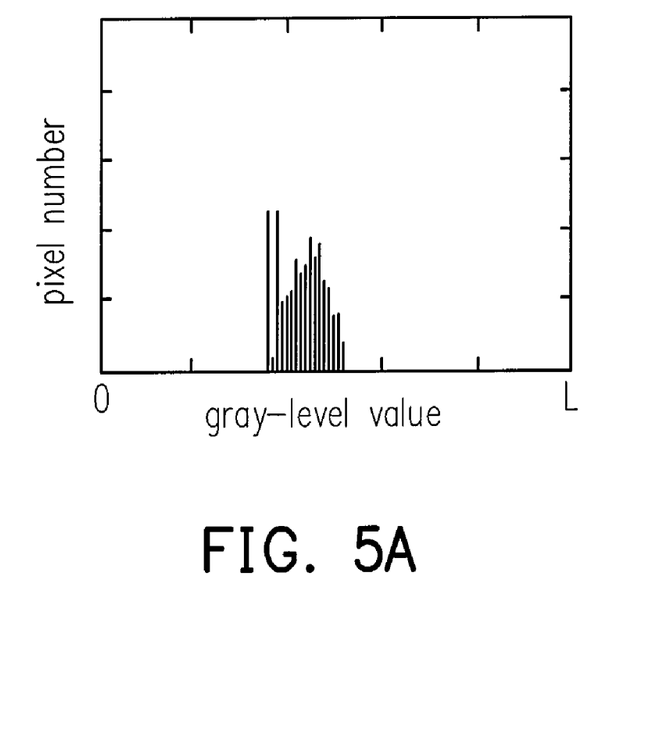
FIG. 5A and FIG. 5B are the respective histograms of one of the regions before and after the contrast process according to one embodiment of the present invention.
Figure 5B:
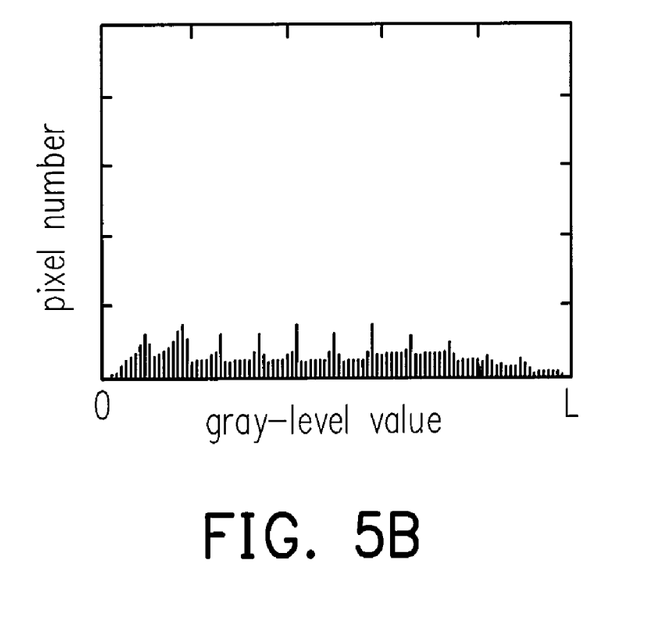

FIG. 4 is a diagram of an image having a plurality of regions according to one embodiment of the present invention. Referring to FIG. 4, the image 410 has the regions 411-414 (only four regions are shown for description herein) and the curves 415-418 are the respective local curves of the regions 411-414. The contrast improvement module 310 performs the contrast process on each of the regions, such as the region 411. FIG. 5A and FIG. 5B are the respective histograms of one of the regions before and after the contrast process according to one embodiment of the present invention. The contrast improvement module 310 analyzes a histogram of the gray-level values of the pixels in the one of the regions, which the histogram is shown in FIG. 5A and the histogram represents the pixel number over each gray-level value. The contrast improvement 310 utilizes a transfer function to equalize the histogram for enhancing the contrast of the gray-level values of the pixels in the one of the regions. Therefore, referring to FIG. 5B, the pixel number of each of the gray-level values within the gray-level range between the gray-level value 0 and the gray-level value L is uniformly distributed.

Referring to FIG. 4, the analysis module 320 analyzes a respective local curve of each of the regions, wherein the local curve is a corresponding relation between the gray-level values of the pixels in each of the regions before and after the contrast process, that is, a mapping relation between the input gray-level value L and the output gray-level value L'. As shown in FIG. 4, the curves 415-418 are the respective local curves of the region 411-414.

Figure 6A:
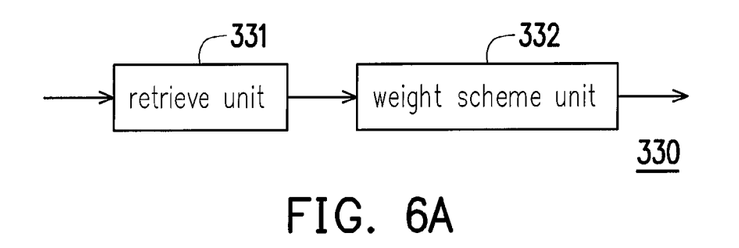
FIG. 6A is a block diagram of the operation module in FIG. 3 according to one embodiment of the present invention.

FIG. 6A is a block diagram of the operation module 330 in FIG. 3 according to one embodiment of the present invention. Referring to FIG. 6A, the operation module 330 includes a retrieve unit 331 and a weight scheme unit 332. The retrieve unit 331 obtains a first gray-level value from the local curve of the one of the region according the one of the pixels in the boundary and obtains a second gray-level value from the local curve of the neighboring region according to the one of the pixels in the boundary, which the said boundary is between the one of the region and the neighboring region. The weight scheme unit 332 is coupled to the retrieve unit 331 and is used for calculating a weight sum of the first gray-level value and the second gray-level value to be the adjusted gray-level value of the one of the pixels in the boundary. The weight sum relates to a distance between the one of the pixels in the boundary and a center of the one of the region and a distance between the one of the pixels in the boundary and a center of the neighboring region.

Figure 6B:
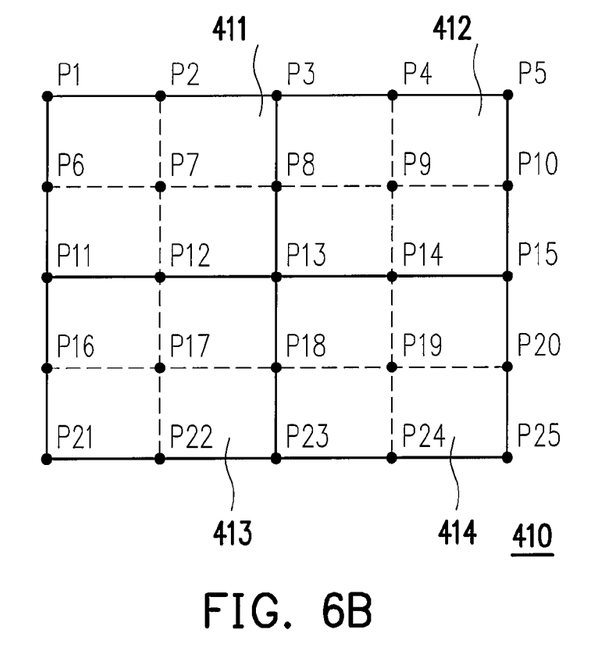
FIG. 6B is a diagram of adjusting one of the pixels in the boundary between the regions according to one embodiment of the present invention.

The following description is an example of adjusting one of the pixels in the boundary. FIG. 6B is a diagram of adjusting one of the pixels in the boundary between the regions according to one embodiment of the present invention. Referring FIG. 4 and FIG. 6B, for the convenience of description, the pixels P1-P25 of the image are marked (only twenty-five pixels are shown for description herein). The pixel P3 is in the boundary between the region 411 and the region 412 so that the retrieve unit 331 obtains an output gray-level value f1 from the local curve 415 of the region 411 according to the input gray-level value of the pixel P3 and the retrieve unit 331 obtains an output gray-level value f2 from the local curve 416 of the region 412 according to the input gray-level value of the pixel P3. Since the distance between the pixel P3 and the center of the region 411 (the pixel P7) equals the distance between the pixel P3 and the center of the region 412 (the pixel P9), the weight scheme unit 332 calculates the weight sum which is an average of the output gray-level value f1 and the output gray-level value f2 to be the adjusted gray-level value of the pixel P3.

To reason by analogy, the pixel P14 is in the boundary between the region 412 and the region 414 so that the retrieve unit 331 obtains an output gray-level value f3 from the local curve 416 of the region 412 according to the input gray-level value of the pixel P14 and obtains an output gray-level value f4 from the local curve 418 of the region 414 according to the input gray-level value of the pixel P14. Since the distance between the pixel P14 and the center of the region 412 (the pixel P9) equals the distance between the pixel P14 and the center of the region 414 (the pixel P19), the weight scheme unit 332 calculates an average of the output gray-level value f3 and the output gray-level value f4 as the adjusted gray-level value of the pixel P14.

Furthermore, the pixel P13 is in the boundary between the regions 411-414. The retrieve unit 331 respectively obtains the output gray-level values f5-f8 from the local curves 415-418 according to the input gray-level value of the pixel P13. Since the respective distances between the pixel P13 and the pixel P7, between the pixel P13 and the pixel P9, between the pixel P13 and the pixel P17 and between the pixel P13 and the pixel P19 are equal, the weight scheme unit 332 calculates a weight sum equaling (f5+f6+f7+f8)/4 to be the adjusted gray-level value of the pixel P13, wherein the pixel P7, P9, P17, P19 are the respective centers of the region 411-414.

Figure 6C:
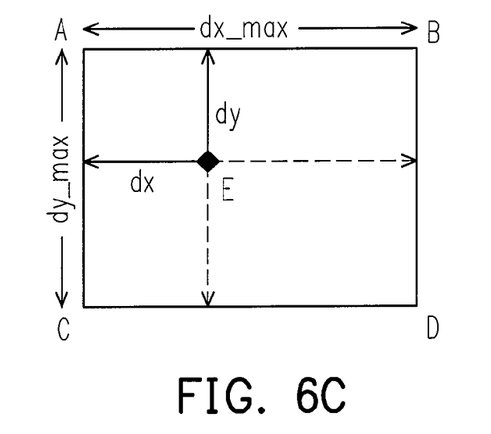
FIG. 6C is a diagram of calculating a weight sum as the adjusted gray-level value of the one of the pixels according to one embodiment of the present invention.

FIG. 6C is a diagram of calculating a weight sum as the adjusted gray-level value of the one of the pixels in the boundary according to one embodiment of the present invention. For convenience of description, the symbols A-D respectively represent the centers of the regions 411-414 and the symbol E represents one of the pixels in the boundary. When the retrieve unit 331 respectively obtains the output gray-level values $F_A$, $F_B$, $F_C$ and $F_D$ from the local curves of the regions 411-414 according to the gray-level value of the pixel E, in mathematics form, the adjusted gray-level value $F_E$ of the pixel E equals $$\frac{dx\_max-dx}{dx\_max}\left(\frac{dy\_max-dy}{dy\_max}\times F_A + \frac{dy}{dy\_max}\times F_C\right) + \frac{dx}{dx\_max}\left(\frac{dy\_max-dy}{dy\_max}\times F_B + \frac{dy}{dy\_max}\times F_D\right).$$

It is noted that the size and the number of the region is not intended to limit the spirit of the invention. In the foregoing embodiment, only four regions of regions are shown for description. People ordinary skilled in the art can divide the image into any region number (at least two regions) as need and enhance the contrast of the image by regions the according to the teaching of the embodiment of the present invention.

Figure 7:
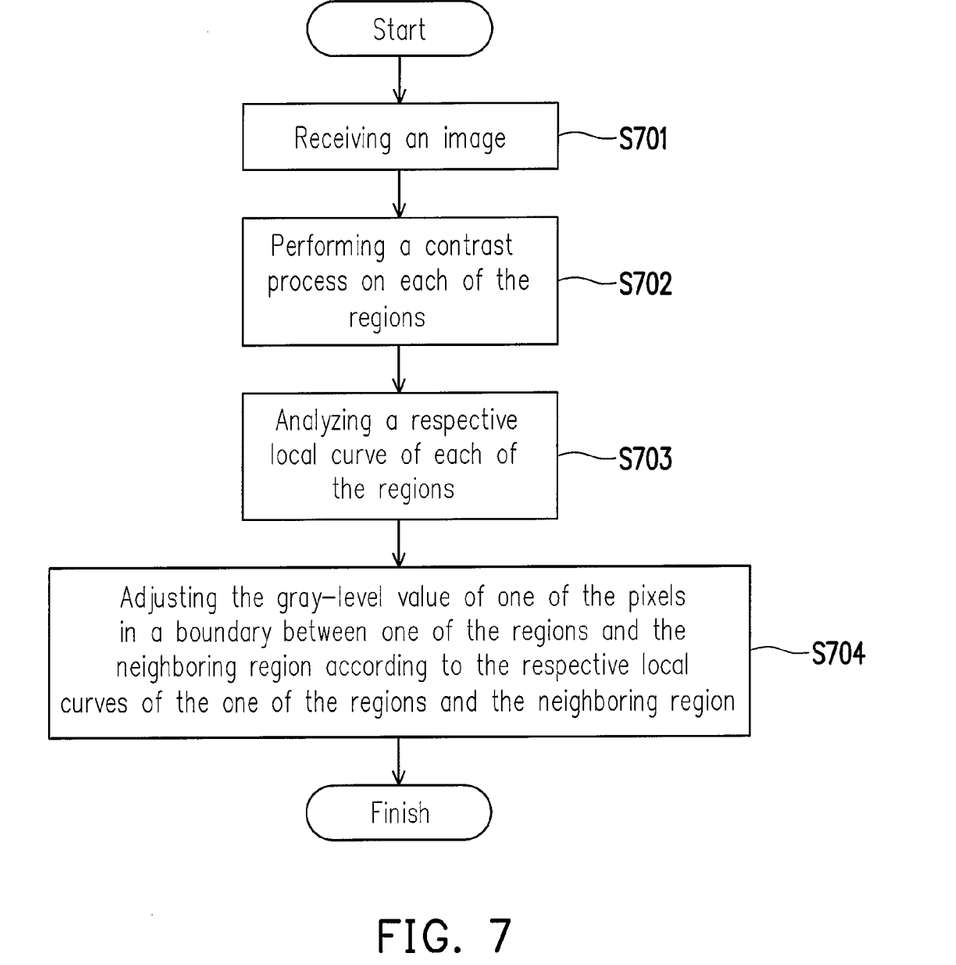
FIG. 7 is a flow chart of a method of image processing according to one embodiment of the present invention.

According to the embodiments described above, the steps of the following method could be generalized. FIG. 7 is a flow chart of a method of image processing according to one embodiment of the present invention. First, in step S701, an image is received, wherein the image has a plurality of regions and each of the regions comprises a plurality of pixels. Next, a contrast process is performed on each of the regions in step S702 so as to locally enhance the image region and a respective local curve of each of the regions is analyzed in step S703, wherein the local curve is a corresponding relation between the gray-level values of the pixels in each of the regions before and after the contrast process. In step S703, the gray-level value of one of the pixels in a boundary between one of the regions and the neighboring region according to the respective local curve of the one of the regions and the neighboring region so as to smooth the non-uniform area in the boundary between the regions.

In summary, the embodiments of the present invention provides a method of image processing and a device thereof that perform a local contrast process on each region of the image for making the features or the details of the image regions obvious. Besides, since the non-uniform area may appear in the boundary between the regions through local contrast enhancement, the embodiments of the present invention analyze the local curve of each of the region, which can response the contrast adjustment result of each region, and provide a weight scheme for adjusting the pixels in the boundary according to the local curve of the regions forming the boundary so as to smooth the non-uniform area. Therefore, the embodiments of the present invention have better performance on the display quality of the image.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A method of image processing, comprising:
   receiving an image, wherein the image has a plurality of regions and each of the regions comprises a plurality of pixels;
   performing a contrast process on each of the regions;
   analyzing a respective local curve of each of the regions, wherein the local curve is a corresponding relation between the gray-level values of the pixels in each of the regions before and after the contrast process; and
   adjusting the gray-level value of one of the pixels in a boundary between one of the regions and the neighboring region according to the respective local curves of the one of the regions and the neighboring region.

2. The method of image processing as claimed in claim 1, wherein the contrast process comprises:
   analyzing a histogram of the gray-level values of the pixels in each of the regions; and
   utilizing a transfer function to equalize the histogram for enhancing the contrast of the gray-level values of the pixels in each of the regions.

3. The method of image processing as claimed in claim 1, wherein the step of adjusting the gray-level value of one of the pixels in the boundary between one of the regions and the neighboring region according to the respective local curves of the one of the regions and the neighboring region comprises:
   obtaining a first gray-level value from the local curve of the one of the regions according to the gray-level value of the one of the pixels in the boundary;
   obtaining a second gray-level value from the local curve of the neighboring region according to the gray-level value of the one of the pixels in the boundary;
   calculating a weight sum of the first gray-level value and the second gray-level value to be the adjusted gray-level value of the one of the pixels in the boundary, wherein the weight sum relates to a distance between the one of the pixel in the boundary and a center of the one of the region, and a distance between the one of the pixel in the boundary and a center of the neighboring region.

4. A device of image processing, comprising:
   a contrast improvement module, receiving an image having a plurality of regions, for performing a contrast process on each of the regions, wherein each of the regions comprises a plurality of pixels;
   an analysis module, coupled to the contrast improvement module, for analyzing a respective local curve of each of the regions, wherein the local curve is a corresponding relation between the gray-level values of the pixels in each of the regions before and after the contrast process; and
   an operation module, coupled to the analysis module, for adjusting the gray-level value of one of the pixels in a boundary between one of the regions and the neighboring region according to the respective local curves of the one of the regions and the neighboring region.

5. The device of image processing as claimed in claim 4, wherein the contrast improvement module analyzes a histogram of the gray-level values of the pixels in each of the regions and utilizes a transfer function to equalize the histogram for enhancing the contrast of the gray-level values of the pixels in each of the regions.

6. The device of image processing as claimed in claim 4, wherein the operation module comprises:
   a retrieve unit, for obtaining a first gray-level value from the local curve of the one of the regions according to the gray-level value of the one of the pixels in the boundary and obtaining a second gray-level value from the local curve of the neighboring region according to the gray-level value of the one of the pixels in the boundary; and
a weight scheme unit, coupled to the retrieve unit, for calculating a weight sum of the first gray-level value and the second gray-level value to be the adjusted gray-level value of the one of the pixels in the boundary, wherein the weight sum relates to a distance between the one of the pixel in the boundary and a center of the one of the region, and a distance between the one of the pixel in the boundary and a center of the neighboring region.

* * * * *